(12) United States Patent
Thominet et al.

(10) Patent No.: US 7,594,607 B2
(45) Date of Patent: Sep. 29, 2009

(54) OPTICAL IMAGING SYSTEM

(75) Inventors: Vincent Thominet, Morges (CH); Ulrich Kallmann, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 504 days.

(21) Appl. No.: 10/583,988

(22) PCT Filed: Dec. 22, 2004

(86) PCT No.: PCT/DE2004/002816

§ 371 (c)(1),
(2), (4) Date: Jun. 23, 2006

(87) PCT Pub. No.: WO2005/061989

PCT Pub. Date: Jul. 7, 2005

(65) Prior Publication Data
US 2007/0145143 A1 Jun. 28, 2007

(30) Foreign Application Priority Data
Dec. 23, 2003 (DE) .................................. 103 61 569

(51) Int. Cl.
*G02B 5/00* (2006.01)
(52) U.S. Cl. .............. 235/462.32; 235/454; 235/462.01
(58) Field of Classification Search ............ 235/462.32, 235/454, 462.01, 462.21, 462.41
See application file for complete search history.

(56) References Cited

U.S. PATENT DOCUMENTS

| 3,927,254 | A | 12/1975 | Lessman et al. |
| 4,875,777 | A | 10/1989 | Harding et al. |
| 6,494,373 | B2* | 12/2002 | Tanaami et al. ............. 235/454 |
| 6,832,724 | B2* | 12/2004 | Yavid et al. .................. 235/454 |
| 6,871,788 | B2* | 3/2005 | Tompkin et al. ............. 235/487 |

FOREIGN PATENT DOCUMENTS

| EP | 0 047 936 | 3/1982 |
| EP | 0 872 752 | 10/1998 |
| GB | 673 971 | 6/1952 |
| GB | 709 431 | 5/1954 |
| WO | WO 01/27558 | 4/2001 |
| WO | WO 02/14858 | 2/2002 |

OTHER PUBLICATIONS

A. Donges, R. Noll in "Lasermesstechnik" ["Laser Measurement Technology"], Hüthig Verlag, 1993.
H. J. Tiziani, "Optical methods for precision measurements," Optical and Quantum Electronics, vol. 21, 253-282, 1989.

* cited by examiner

*Primary Examiner*—Seung H Lee
(74) *Attorney, Agent, or Firm*—Kenyon & Kenyon LLP

(57) ABSTRACT

An optical imaging system includes a system of optical components for generating an image of a surface of a component which emits light which is radially symmetrical, at least in part, for an optical surface measurement thereof, the surface normal of the radially symmetrical region in the measuring position of the component being inclined at a maximum angle of 90° with respect to the component axis. Radially symmetrical outer surface regions having surface normals directed at an angle with respect to the axis of symmetry may be quickly and easily provided for testing surface characteristics by designing the system for measuring outer surfaces, and including a mirror which may be associated with the component and which in measuring mode captures the portion of the beam emitted from the radially symmetrical region of the surface to be measured and supplies same to additional imaging components in the system for processing the image.

20 Claims, 1 Drawing Sheet

OPTICAL IMAGING SYSTEM

FIELD OF THE INVENTION

The invention relates to an optical imaging system having a system of optical components for generating an image of a surface of a component which emits light which is radially symmetrical, at least in part, for an optical surface measurement of same, the surface normal of the radially symmetrical region in the measuring position of the component being inclined at a maximum angle of 90° with respect to the component axis, i.e., the axis of symmetry.

DESCRIPTION OF RELATED ART

Such an optical imaging system is described in WO 02/14858 and WO 01/27558, for example. This known imaging system allows measurements to be made, even on surface regions in narrow boreholes, interference patterns being generated in the imaging which are evaluated by white light interferometric methods.

In principle, other interferometric measuring methods for evaluating surface characteristics are also suitable, such as heterodyne interferometry. With regard to interferometry, general reference is made to A. Donges, R. Noll in "Laser-messtechnik" ["Laser Measurement Technology"], Hüthig Verlag, 1993, and with regard to heterodyne interferometry, to H. J. Tiziani, "Optical methods for precision measurements," Optical and Quantum Electronics, Vol. 21, 253-282, 1989. Surface characteristics include, for example, roughness, geometric shape, or deviations in geometric shape. As optical measuring methods, methods for image evaluation may also be considered, for example, which evaluate information other than interference phenomena in the image.

In particular, to ensure quality of the corresponding components, the manufacture of precision parts also requires suitable measuring methods for determining the, for example, geometry and characteristics of the parts. In this case as well, optical measuring methods such as image acquisition and image evaluation as well as interferometry make important contributions. In addition to the requirement for precision of a measuring system in the detection of features of interest, there is the requirement for high measuring speed, which allows the measuring system to be integrated into a rapid, automated manufacturing process. For many precision parts which, for example, have a predominantly flat geometry, these requirements may be met by known methods and available optical components. In addition, it is possible to perform measurements even in narrow cavities by use of the previously described systems according to WO 02/14858 and WO 01/27558. For one class of precision parts which may be characterized, for example, by curved outer surfaces of the component, or approximately by an outer cone, such as valve needles, for example, no satisfactory method has been found thus far that is able to simultaneously meet the requirements described above.

SUMMARY OF THE INVENTION

It is an object of the invention to provide an optical imaging system of the type described above by which outer surfaces which are radially symmetrical, at least in part, are imaged in such a way that the surface characteristics may be determined quickly and with minimum complexity.

This and other objects of the invention are achieved by an optical imaging system comprising a system (1) of optical components for generating an image of a surface (20.1) of a component (20) which emits light which is radially symmetrical, at least in part, for an optical surface measurement thereof, the surface normal of the radially symmetrical region in the measuring position of the component being inclined at a maximum angle of 90° with respect to the component axis, wherein the system (1) is designed for measuring outer surfaces (20.1), and includes a mirror (2) which can be associated with the component (20) and which in measuring mode captures the portion of the beam emitted from the radially symmetrical region of the surface to be measured and supplies same to additional imaging components in the system (1) for processing the image. According to the invention, the system is designed for measuring outer surfaces, and includes a mirror which may be associated with the component and which in measuring mode captures the portion of the beam reflected from the radially symmetrical region of the surface to be measured and supplies same to additional imaging components in the system for processing the image.

The image of the radially symmetrical region of, for example, a partially or entirely conical outer surface, or an outer surface which is cylindrical or also curved in a concave or convex manner with respect to the axial direction, obtained in this manner results in a large measuring region which may be covered by one measurement. This makes a short measuring time, and in many cases, such as in the testing of valve needles, for example, the use of such an optical measuring system in automated manufacturing possible.

The referenced measures allow a large proportion of the light beams originating from a point on the radially symmetrical outer surface to be collected, despite the unfavorable reflection angle. This allows high resolution of the image and contributes to high precision in the measuring system.

BRIEF DESCRIPTION OF THE DRAWINGS

The invention will be described in greater detail with reference to the following drawings wherein.

DETAILED DESCRIPTION OF THE INVENTION

Figure 1:
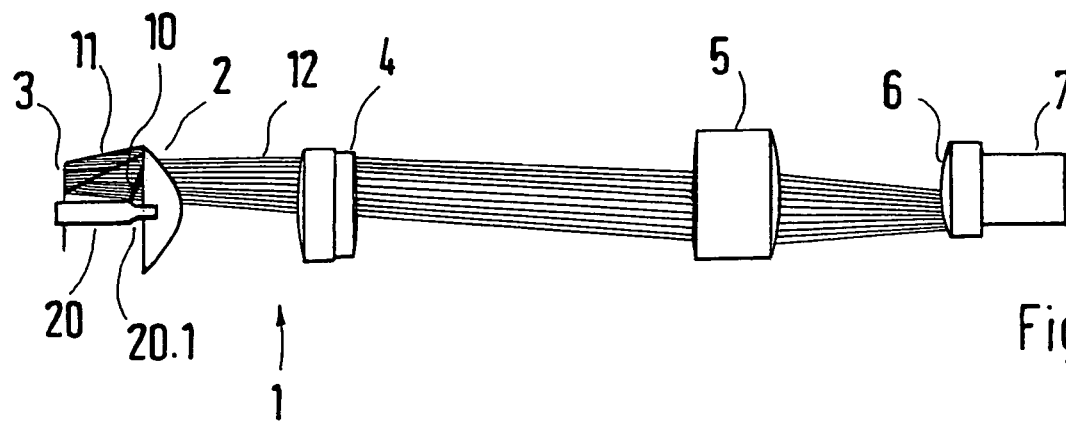
FIG. 1 shows a schematic illustration of an optical imaging system for an outer cone of a component, together with a beam path.

Precise imaging of the radially symmetrical region to be measured, while covering a large measuring region, is facilitated by providing the mirror with a radially symmetrical design, at least in part, and by designing and positioning the mirror for directly receiving the light reflected from the region when in measuring mode.

The design of the imaging system for advantageous beam guidance is also benefited when the mirror has a circumferential radially symmetrical design and a central opening, and when a reflecting optical element situated in the beam path downstream from the mirror receives the light reflected from the mirror and directs the light through the central opening.

According to the present invention, the reflecting optical element likewise has a radially symmetrical design and a central opening, resulting in the possibility of a simple arrangement with respect to the imaging system even of elongated components, for example, which is advantageous for use in a manufacturing process.

To achieve intended imaging characteristics, measures are also advantageous in which lens elements for processing the image are provided in the beam path downstream from the reflecting optical element.

Accurate surface measurements may be made by, for example, designing the system in such a way that it generates an image which may be interferometrically evaluated.

In one advantageous design, the system may have a two-dimensional image recorder on which imaging occurs.

According to the present invention, the system is designed as an object arm of an interferometric measuring system, which results in an advantageous integration into such a measuring system.

For connecting to an evaluation system, measures in which the system is designed to generate an intermediate image may also be advantageous.

In a further design variant, a transmissive optical element is provided directly downstream from the mirror for receiving the beam reflected from the mirror.

The measures described above may be used to advantageously image the referenced outer surface regions that are radially symmetrical, at least in part, such as outer conical surfaces, for example. When optically imaged, such outer surfaces have a predominant direction of reflection of the light beams which runs along the surface normals. These surface normals have a radially symmetrical configuration for the radially symmetrical outer surface regions such as outer conical surfaces, and, depending on the type of radially symmetrical surface region, form a relatively large angle of, for example, >45°, measured with respect to the longitudinal axis of the radially symmetrical region. The described system of optical surfaces and components is able to deflect and collect light rays originating from the surface of the component to be measured so that, despite the unfavorable beam direction relative to the longitudinal axis of the radially symmetrical region or component, an image of the surface is obtained which is suitable for evaluation. In addition, the optical system is designed in such a way that, for example, an entire circumferential region is imaged in an area, which allows further evaluation to be performed in a short time, using simple measures. The image of a circumference of the radially symmetrical surface may be captured directly by a light detector which measures in two dimensions, a CCD camera, for example, or may be made available to a further optical system which operates, for example, according to the principle of white light interferometry.

To evaluate the image, it is advantageous for the image to be generated in a plane perpendicular to the optical axis of the system, i.e., to the axis of symmetry of the radially symmetrical surface region to be measured, it also being possible for the imaging to record elevations or depressions which may easily be taken into account in the further evaluation, for example, by scanning. For example, a transition region of an outer conical surface of a valve needle which changes to a cylindrical region thereof may be measured in this manner, the annular circular transition line between the two regions being rendered in the imaging as the highest (frontmost) gradation line in the direction of the beam path.

Figure 2:
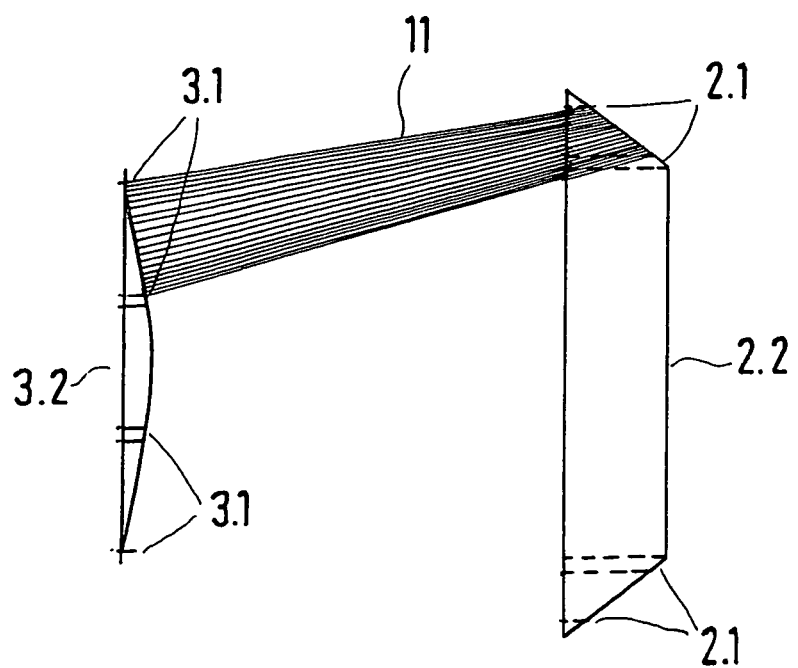
FIG. 2 shows an enlarged detail of the imaging system according to FIG. 1.

As apparent from FIGS. 1 and 2, an optical imaging system having a system 1 of optical components is associated with a component 20, by which a circumferential, radially symmetrical outer conical surface of component 20 is imaged on a, for example, image recorder 6 of a processing unit 7.

A ray beam 10 emitted, for example by reflection, from outer conical surface 20.1 to be measured strikes a usable surface 2.1—running circumferentially in a radially symmetrical manner about the same axis of symmetry, corresponding to outer conical surface 20.1—of a mirror 2 having a central opening 2.2. Ray beam 10 reflected from usable surface 2.1 of mirror 2 is directed to an additional reflecting optical element 3, preferably in the form of an additional mirror, is deflected by this element through opening 2.2 of mirror 2, and is processed via lens elements 4, 5 situated in the further beam path to generate, on image recorder 6, the optical image of outer conical surface 20.1 to be measured. Additional reflecting optical element 3 likewise has a usable surface region 3.1, which runs circumferentially in a radially symmetrical manner with respect to the common axis of symmetry and surrounds a central opening 3.2. Component 20 may be easily inserted into the optical imaging system through central opening 3.2 during a manufacturing process, for example, so that it assumes the relative position with respect to mirror 2 necessary for the intended imaging.

Component 20 to be measured, a valve needle, for example, is thus positioned in the optical imaging system, where central openings 2.2 and 3.2 in the mirror and in additional reflecting optical element 3, respectively, allow for a simple system. For short components, an embodiment is also possible in which the additional reflecting optical element in the form of additional mirror 3 has no central opening, and the component is inserted from the side between mirror 2 and additional reflecting optical element 3. The exact shape and size of mirrors 2 and 3 are matched to the component to be measured, i.e., the radially symmetrical region to be measured, for example in the form of outer conical surface 20.1, to generate an image which is suitable for subsequent evaluation. If emitted ray beam 10 is generated by reflection, at least the region of component 20 to be measured is suitably illuminated, depending on the intended operating mode of the processing portion of the measuring system performing the evaluation. For example, low-coherence radiation is used for illumination when the evaluation is to be performed by white light interferometry and is to be based on interference patterns for assessing the surface characteristics. In addition to strict deflection characteristics, mirrors 2, 3, may also have imaging characteristics for co-generating the intended image, and, for example, may be flat or have concave or convex curvatures, and their angles of inclination for guiding the ray beam may also be oriented differently with respect to the axis of symmetry.

In one alternative embodiment of the optical imaging system, it is also possible to replace additional reflecting optical element 3 by a transmissive element, such as, for example, a lens, a prismatic element, or the like, so that the beam path runs in the opposite direction compared to FIG. 1, and may be processed by additional imaging elements situated downstream.

The imaging system may, for example, be designed totally or partially as an object arm of an interferometer with which a reference arm is associated, as is common in interferometric measurements. The optical imaging system may also be designed to generate an intermediate image upon which the evaluation is based.

Using the optical imaging system, in particular radially symmetrical surface regions of component 20, the surface normals of which run at an angle with respect to the axis of symmetry and are inclined at an angular range between 0° and 90° with respect to the axis of symmetry, may be imaged for further evaluation. In other words, an angle of the normals which is 90° with respect to the axis of symmetry would belong to a cylindrical surface region of component 20, whereas a normal angle of 0° with respect to the axis of symmetry would represent a surface perpendicular to the axis of symmetry. However, the described optical imaging system has advantages in particular for surface normals which run between these boundary surfaces at an inclined angle with respect to the axis of symmetry.

What is claimed is:

1. An optical imaging system arranged for generating an image of a region of a surface of a component, the region (a) being radially symmetrical about an axis of the component and (b) emitting light, the surface being such that a surface normal of the radially symmetrical region, at a measuring position is inclined at a maximum angle of 90° with respect to the component axis, the imaging system comprising:
   a mirror that, in a measuring mode captures a portion of a light beam emitted from the radially symmetrical region; and
   at least one additional imaging component, wherein:
      the mirror supplies the captured portion of the light beam to the at least one additional imaging component for processing by the at least one additional imaging component of the captured portion of the light beam to produce the image; and
      the imaging system is configured to measure the surface at the measuring position.

2. The imaging system according to claim 1, wherein a size and a shape of the mirror depends on a size and shape of the region of the surface of the component.

3. The imaging system according to claim 1, wherein the mirror has a radially symmetrical design, at least in part, and is designed and positioned for directly receiving, in the measuring mode, the light beam emitted from the region.

4. The imaging system according to claim 3, wherein the mirror has a circumferential radially symmetrical design and a central opening, the imaging system further comprises:
   a reflecting optical element situated in a beam path of the light beam and downstream, with respect to the beam path, from the mirror, the mirror reflecting the light beam to the reflecting optical element, the optical element directing the reflected light beam through the central opening.

5. The imaging system according to claim 4, wherein the reflecting optical element has a radially symmetrical design and a central opening.

6. The imaging system according to claim 5, wherein the at least one additional imaging component includes lens elements in the beam path and downstream, with respect to the beam path, from the reflecting optical element.

7. The imaging system according to claim 4, wherein the at least one additional imaging component includes lens elements in the beam path and downstream, with respect to the beam path, from the reflecting optical element.

8. The imaging system according to claim 3, wherein the system is designed to generate the image such that the image can be interferometrically evaluated.

9. The imaging system according to claim 3, further comprising:
   a two-dimensional image recorder, wherein the image is generated on the two-dimensional image recorder.

10. The imaging system according to claim 3, wherein the system is designed as an object arm of an interferometric measuring system.

11. The imaging system according to claim 3, further comprising:
   a transmissive optical element directly downstream, with respect to a beam path of the light beam, from the mirror for receiving the light beam reflected from the mirror.

12. The imaging system according to claim 1, wherein the mirror has a circumferential radially symmetrical design and a central opening, the imaging system further comprises:
   a reflecting optical element situated in a beam path of the light beam and downstream, with respect to the beam path, from the mirror, the mirror reflecting the light beam to the reflecting optical element, the optical element directing the reflected light beam through the central opening.

13. The imaging system according to claim 12, wherein the reflecting optical element has a radially symmetrical design and a central opening.

14. The imaging system according to claim 13, wherein the at least one additional imaging component includes lens elements in the beam path and downstream, with respect to the beam path, from the reflecting optical element.

15. The imaging system according to claim 12, wherein the at least one additional imaging component includes lens elements in the beam path and downstream, with respect to the beam path, from the reflecting optical element.

16. The imaging system according to claim 1, wherein the system is designed to generate the image such that the image can be interferometrically evaluated.

17. The imaging system according to claim 1, further comprising:
   a two-dimensional image recorder, wherein the image is generated on the two-dimensional image recorder.

18. The imaging system according to claim 1, wherein the system is designed as an object arm of an interferometric measuring system.

19. The imaging system according to claim 18, wherein the system is designed to generate an intermediate image.

20. The imaging system according to claim 1, further comprising:
   a transmissive optical element directly downstream, with respect to a beam path of the light beam, from the mirror for receiving the light beam reflected from the mirror.

* * * * *

UNITED STATES PATENT AND TRADEMARK OFFICE
CERTIFICATE OF CORRECTION

PATENT NO. : 7,594,607 B2
APPLICATION NO. : 10/583988
DATED : September 29, 2009
INVENTOR(S) : Thominet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 602 days.

Signed and Sealed this

Twenty-eighth Day of September, 2010

David J. Kappos
*Director of the United States Patent and Trademark Office*